(12) United States Patent
Best et al.

(10) Patent No.: US 11,487,646 B2
(45) Date of Patent: Nov. 1, 2022

(54) DYNAMIC TEST CASE TIMERS

(71) Applicant: Red Hat, Inc., Raleigh, NC (US)

(72) Inventors: Steven Francis Best, Groton, MA (US); David Bryce Arcari, North Grafton, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/290,668

(22) Filed: Mar. 1, 2019

(65) Prior Publication Data
US 2020/0278919 A1 Sep. 3, 2020

(51) Int. Cl.
*G06F 9/44* (2018.01)
*G06F 9/455* (2018.01)
*G06F 11/36* (2006.01)
*G06F 9/48* (2006.01)

(52) U.S. Cl.
CPC ...... *G06F 11/3688* (2013.01); *G06F 9/45558* (2013.01); *G06F 9/4887* (2013.01); *G06F 11/3664* (2013.01)

(58) Field of Classification Search
CPC ............. G06F 11/3688; G06F 11/3664; G06F 9/4558; G06F 9/4887; G06F 9/45558
See application file for complete search history.

(56) References Cited

U.S. PATENT DOCUMENTS

| 7,000,224 | B1* | 2/2006 | Osborne, II | G06F 11/3688 714/738 |
| 8,782,609 | B2 | 7/2014 | Robinson | |
| 8,854,049 | B2 | 10/2014 | Bogenberger et al. | |
| 9,396,039 | B1* | 7/2016 | Arguelles | G06F 11/3688 |
| 9,811,451 | B1* | 11/2017 | Arguelles | G06F 11/3688 |
| 2009/0259870 | A1* | 10/2009 | Sharma | G06F 9/45533 713/400 |
| 2014/0019624 | A1* | 1/2014 | Kusuta | G06F 9/5077 709/226 |
| 2014/0258784 | A1* | 9/2014 | Tepus | G06F 11/368 714/38.1 |
| 2015/0032436 | A1* | 1/2015 | van de Kamp | G06F 11/3414 703/13 |
| 2015/0113331 | A1 | 4/2015 | Bhattacharya et al. | |
| 2015/0278079 | A1* | 10/2015 | Cheng | G06F 9/45558 718/1 |
| 2016/0041543 | A1* | 2/2016 | Monczynski | G05B 19/41875 700/97 |
| 2016/0328281 | A1* | 11/2016 | Lee | G06F 11/277 |

(Continued)

FOREIGN PATENT DOCUMENTS

CN 102419727 B 5/2016
CN 108964992 A 12/2018

OTHER PUBLICATIONS

Heisei, JP2016-503213 A1, 2016, pp. 1-21. (Year: 2016).*

(Continued)

*Primary Examiner* — Mongbao Nguyen
(74) *Attorney, Agent, or Firm* — Haynes and Boone, LLP

(57) ABSTRACT

Systems, methods, and machine-readable instructions stored on machine-readable media are disclosed for adjusting a time limit for a test based on one or more indications of availability. A test is executed, wherein the test includes a time limit. A determination is made that the time limit is exceeded. In response, the time limit is adjusted based on one or more indications of availability.

17 Claims, 3 Drawing Sheets

200

Executing a test by a virtual machine guest, wherein the test includes a time limit — 202

Determining that the time limit is exceeded — 204

Adjusting, in response to the determining, the time limit based on one or more indications of availability of a host of the virtual machine — 206

(56) References Cited

U.S. PATENT DOCUMENTS

| | | | |
|---|---|---|---|
| 2016/0350163 A1* | 12/2016 | Nahir | G06F 11/079 |
| 2017/0004062 A1* | 1/2017 | Cheng | G06F 9/45533 |
| 2017/0075791 A1* | 3/2017 | Ramakrishna | G06Q 10/06 |
| 2017/0139819 A1* | 5/2017 | D'Andrea | G06F 11/3688 |
| 2017/0262361 A1 | 9/2017 | Francis et al. | |
| 2018/0007077 A1* | 1/2018 | Boia | G06F 9/45508 |
| 2018/0024916 A1* | 1/2018 | Shazly | G06F 11/3696 717/124 |
| 2018/0109464 A1* | 4/2018 | Chen | G06F 9/5077 |
| 2018/0267884 A1 | 9/2018 | Dhanda et al. | |
| 2018/0307583 A1* | 10/2018 | Yang | G06F 11/368 |
| 2018/0329812 A1* | 11/2018 | Friedenberg | G06F 11/3696 |
| 2019/0056972 A1* | 2/2019 | Zhou | G06F 11/3476 |
| 2019/0081812 A1* | 3/2019 | Arbogast | G06F 11/3058 |
| 2019/0266023 A1* | 8/2019 | Buil | G06F 9/5038 |
| 2019/0303274 A1* | 10/2019 | Funnell | G06F 11/3688 |
| 2019/0312800 A1* | 10/2019 | Schibler | H04L 41/082 |
| 2020/0004660 A1* | 1/2020 | Falko | G06F 11/368 |
| 2020/0104170 A1* | 4/2020 | Else | G06F 9/4887 |
| 2020/0125485 A1* | 4/2020 | Wiener | G06F 11/3466 |

OTHER PUBLICATIONS

Wes Lloyd, Dynamic Scaling for Service Oriented Applications: Implications of Virtual Machine Placement on IaaS Clouds, 2014, pp. 271-276. https://ieeexplore.ieee.org/stamp/stamp.jsp?tp=&arnumber=6903482&isnumber=6903436 (Year: 2014).*

Chunhui Wang, Automatic Generation of System Test Cases from Use Case Specifications, 2015, pp. 385-395. https://dl.acm.org/doi/pdf/10.1145/2771783.2771812 (Year: 2015).*

Qi Luo, How Do Static and Dynamic Test Case Prioritization Techniques Perform on Modern software system? An extension study on GitHub projects, 2018, pp. 1-26. https://arxiv.org/pdf/1806.09774.pdf (Year: 2018).*

Lu Zhang, Time-Aware Test-Case Prioritization using Integer Linear Programming, 2009, pp. 213-222. https://dl.acm.org/doi/pdf/10.1145/1572272.1572297 (Year: 2009).*

Nash, John "Unit Testing timer Based Code", web article, Jun. 17, 2016, 10 pages, Capgemini Group, https://capgemini.github.io/development/testing-timers/.

* cited by examiner

DYNAMIC TEST CASE TIMERS

FIELD OF DISCLOSURE

The present disclosure generally relates to data processing, and more particularly to software testing.

BACKGROUND

Virtualization is technology that allows a user to create multiple simulated environments or dedicated resources from a single, physical hardware system. Software called a hypervisor connects directly to that hardware and allows a user to split a single system into separate, distinct, and secure environments known as virtual machines (VMs). These VMs rely on the hypervisor's ability to separate the machine's resources from the hardware and distribute them appropriately.

The physical hardware, equipped with the hypervisor software, is called the host, while the many VMs that use its resources are guests. These guests treat computing resources—like CPU, memory, and storage—as a pool of resources that can easily be relocated. Hypervisors can control virtual instances of CPU, memory, storage, and other resources, so guests receive the resources they need when they need them.

Virtual machines can run a variety of applications, including software testing applications. Individual test cases may be run in parallel across a large number of virtual machines to improve efficiency.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: executing a test, wherein the test includes a time limit; determining that the time limit is exceeded; and adjusting, in response to the determining, the time limit based on one or more indications of availability. Other examples of this aspect include corresponding computer systems, apparatus, and computer programs recorded on one or more computer storage devices, each configured to perform the actions of the methods.

One general aspect includes a method including: executing a test, wherein the test includes a time limit; determining that the time limit is exceeded; and adjusting, in response to the determining, the time limit based on one or more indications of availability. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: executing a test, wherein the test includes a time limit; determining that the time limit is exceeded; and adjusting, in response to the determining, the time limit based on one or more indications of availability. Other examples of this aspect include corresponding computer systems, apparatus, and computer programs recorded on one or more computer storage devices, each configured to perform the actions of the methods.

DETAILED DESCRIPTION

Figure 1:
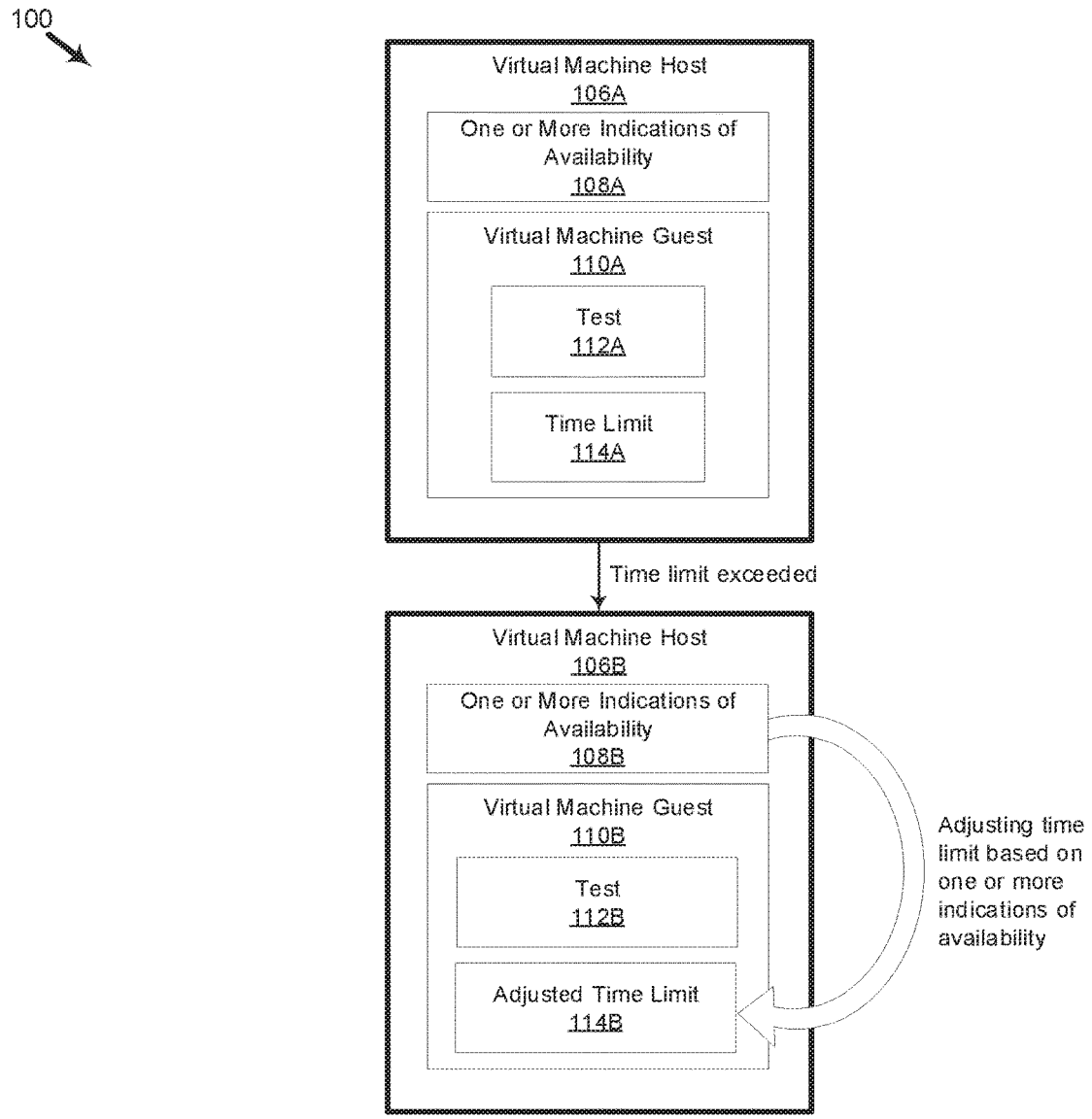
FIG. 1 is an organizational diagram illustrating a system for adjusting a time limit for a test based on one or more indications of availability.
Figure 1:
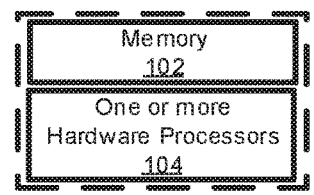

Software testing may be performed according to test cases, which represent a set of conditions or variables to be tested, a test procedure, expected results, etc. A test procedure may include a series of individual tests. The amount of time to complete the test case may be limited by a time limit. The time limit may apply to the individual tests, or to the test case as a whole. If a test does not complete in a set amount of time, the test may timeout and the test case may fail. Such failures may be indicative of genuine errors in the test case's programming, e.g., an infinite loop. However, some of these failures may also be false positives. For example, a perfectly good test case being run on a busy system may still fail (by timeout) if the system is unable to efficiently perform the test procedures. Based on the failure, a user may wrongly conclude that the test case is erroneous, when in fact it simply needed more time to complete and would have run to completion had the system not terminated the test case according to a statically preset time limit.

In continuous integration and continuous delivery (CI/CD) environments, such system delays are more likely to occur because resources tend to be shared. For example, many CI/CD environments are virtualized and run on virtual machines. Yet, preventing false positives is especially important because CI/CD environments tend to be completely automated and any testing errors—even false positives—could cause a CI/CD pipeline to grind to a halt. Precious developer time and resources would then need to be expended to investigate and address the error.

Thus, it is desirable to replace traditional test case timers using preset time limits with dynamic test case timers using dynamically adjustable time limits. A dynamic test case timer may dynamically change test case time limits by increasing or decreasing the time limits at any time and based on any input. For example, the time limits may be changed depending on how busy the system currently is. The dynamic test case timer may capture statistics, such as the time taken for a particular operation, an individual test, or an entire test case to complete. These statistics may be captured and stored in a data structure, such as a database, maintained on the host, guest, or both. Thus, the dynamic test case timer may adjust time limits based on current and historical information.

As an example, an application may include a feature that saves the state of a document every 5 seconds. To verify that the auto-save feature works, we might write a test as follows:

```
Fun testSavingDocument( ) {
let document = Document( )
documentController.open(document)
// An expectation is used to make the test runner wait for an
// async operation to be completed.
let delayExpectation = expectation(description: "Waiting for document
to be saved")
// Fulfill the expectation after 5 seconds
// (which matches our document save interval)
DispatchQueue.main.asyncAfter(deadline: .now( ) + 5) {
delayExpectation.fulfill( )
}
// Wait for the expectation to be fulfilled, if it takes more than
// 5 seconds, throw an error
waitForExpectations(timeout: 5)
XCTAssertTrue(document.isSaved)
}
```

While the above test may work without error when running on a non-busy system, the test may fail if the system is busy and unable to save the document within the timeout limit. For example, disk access delays could be caused by resources being shared by other projects. This leads to inconsistent test runs. A dynamic test case timer would solve the timeout failure problem by increasing the timeout limit to account for the system's reduced availability, while still providing the assurance that the tested feature works as designed, e.g., that an autosave feature designed to save every 5 seconds would save every 5 seconds and not every 10 or 15 seconds when the system's availability is restored. For example, if the file is successfully saved every 5 seconds at 20% system utilization, then increases to 6 seconds at 80% system utilization, but returns to 5 seconds at 15% system utilization, and the 1 second delay at 80% system utilization is typical for the system, it may be determined that the 1 second delay is attributable to the increase in system utilization and not to incorrect programming of the auto-save feature to execute every 6 seconds instead of 5 seconds.

But if the delay values and patterns were to change in a way that cannot be explained by system delays, it may instead be determined that someone or something has modified the tested feature (e.g., auto-save timing), for example, from 5 seconds to 10 seconds, and that the wrong test (i.e., the 5 second test) is still being used to test the modified auto-save feature. Such a determination may be made when, for example, the delay is greater than a predetermined percentage of the time limit, or greater than a predetermined number of standard deviations from an average test duration, or greater than a predetermined fixed value of time, or a combination thereof. Other techniques for detecting and measuring anomalies in data may also be used. Such predetermined percentage, number of standard deviations, and fixed value of time thus form a "system delay adjustability range," and provides the dynamic test case timer with a dynamic or static range within which a test case's time limit may be safely adjusted without risk of causing the test to appear like it had been incorrectly modified.

Thus, where the measured delays are out-of-range, the failure of the test to complete in the expected time may not be a false positive addressable by dynamically increasing the time limit. As explained, the failure may be indicative of a more fundamental error in the test case that may require a tester's attention. For example, if the wrong test (e.g., 5 second autosave test) were being used to test a new feature (10 second autosave feature), increasing the time limit from 5 seconds to 10 seconds may still not allow the old 5 second autosave test to work with the new 10 second autosave feature if the new 10 second autosave feature relies on a different set of functions not found in the old 5 second autosave test. The proper remedy would be to use a new testing function or test case rather than to simply dynamically increase the time limit. Thus, the dynamic test case timer's ability to identify the types of situations where dynamic adjustment is warranted and the types of situations where it is not further reduces the number of false positives, and further improves the flow of the CI/CD pipeline.

FIG. 1 is an organizational diagram illustrating a system 100 for dynamically adjusting a time limit 114A for a test 112A, in accordance with various examples of the present disclosure. The system 100 includes a non-transitory memory 102 and one or more hardware processors 104 coupled to the non-transitory memory 102. In the present example, the one or more hardware processors 104 executes instructions from the non-transitory memory 102 to perform operations for: executing a test 112A by a virtual machine guest 110A, wherein the test 112A includes a time limit 114A; determining that the time limit 114A is exceeded; and, in response to the determining that the time limit 114A is exceeded, adjusting the time limit 114A based on one or more indications of availability 108A of a host 106A of the virtual machine guest 110A.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output (I/O) components such as a keyboard, mouse, touch interface, and/or camera that process(es) user actions such as key presses, clicks, taps, and/or gestures and sends a corresponding signal to the bus or other communication mechanism. The I/O component may also include an output component such as a display.

In some examples, a user may use the I/O component to command the system 100, via a user interface such as a graphical user interface, a command line interface, or any other interfaces a user may use to communicate with system 100, to push, upload, transfer, send, communicate, link, or otherwise cause a test 112A to be executed by the virtual machine guest 110A. Further, the virtual machine guest 110A may execute test 112A as part of a testing suite associated with a software development platform, such as RED HAT OPENSHIFT, or a software development pipeline such as JENKINS. In some examples, the software development pipeline is a component of the larger software development platform. Such CI/CD platforms and pipelines may include automated software testing. Thus, test 112A may be executed as part of an automated testing process and be included as one of many tests in an automated testing suite.

As explained earlier, the physical hardware system whose resources are split across one or more virtual machine guests is referred to a virtual machine host. An example of a virtual machine host is virtual machine host 106A. In FIG. 1, virtual machine host 106A is illustrated as hosting only one virtual machine guest 110A, but many more virtual machine guests may be hosted by virtual machine host 106A. The virtual machine host 106A and/or the virtual machine guest 110A includes one or more indications of availability 108A. Examples of indications of availability 108A include an amount of computing resources of the host 106A that is utilized, an amount of computing resources of the host 106A that remains available, an amount of virtualized computing resources assigned to the guest 110A, an amount of virtualized computing resources utilized by the guest 110A, and an amount of virtualized computing resources remaining available to the guest 110A. The one or more indications of availability 108A may be stored and maintained by the host 106A or the guest 110A. In some examples, the guest 110A may access the one or more indications of availability 108A via the hypervisor. In some examples, the guest 110A may access the one or more indications of availability 108A directly.

Computing resources may include processing resources, memory resources, and I/O resources. Processing resources may include the speed of the processor, the number of cores, the number of logical processors, a utilization percentage, the number of processes, the number of threads, the number of handles, the sizes of the processor caches, etc. Memory resources may include the amount of memory in use, the amount of memory available, the speed of the memory, the amount of committed memory, the size of the cached memory, the size of the paged and non-paged pools, etc. The input/output resources may include the transfer rate, read speed, write speed, and the active time of a storage device.

In some examples, the one or more indications of availability 108A includes one or more percentages of available processing, memory, and input/output resources, e.g., 40% CPU, 31% MEM, and 98% DISK. In some examples, the one or more indications of availability 108A is further broken down to a per processor, per core, per thread, or per storage device level. For example, such a breakdown may be useful if virtual machine guest 110A is active on a first storage device but not on a second storage device. As a result, I/O operations on the second storage device may not affect the I/O availability of the first storage device, e.g., for performing tests 112A by the guest 110A. Accordingly, the I/O availability of interest may be more specific than a general indication of I/O availability. Similar detailed breakdowns in processing and memory resources may be useful for analogous reasons. Nevertheless, a single, overall indication of availability is also useful, e.g., because it is simpler to understand. In some examples, the single, overall indication may be determined by assigning weights to each type of computing resource, with the most weight assigned to the (detailed) type of computing resource that the test 112A is most likely to use. For example, the availability of the first storage device may be assigned a weight of 0.8, while processor and memory availability may be assigned weights of 0.1 each. Thus, the single, overall indication of availability may be calculated by multiplying each of the indications of availability by their assigned weighs and summing the values.

Further examples of indications of availability 108A include the number, type, and resource-intensiveness of tasks scheduled to run on the virtual machine host 106A and/or the virtual machine guest 110A. For example, encoding a video at 4K resolution is far more resource-intensive than saving a document every five seconds. If a scheduler, task manager, system stack, kernel stack, or user mode stack shows that the test 112A will be executed while another resource-intensive task is taking place, the time limit 114A may be pre-emptively increased to account for anticipated delays caused by the resource-intensive task. The amount by which time limit 114A is increased may be based on previous indications of availability, previous times taken for the test 112A to be completely executed, and previous time limits. For example, if on average the previous indications of availability decrease to e.g., 10% while a particular program is running, and previous time limits for test 112A or for tests similar to test 112A had previously been increased e.g., from 5 seconds to 8 seconds while the program is running, then the time limit 114A for test 112A may pre-emptively be adjusted from 5 seconds to 8 seconds before test 112A is executed if it is known that the program will be running during the execution of test 112A. Since the system delay has been accounted for prior to the test's 112A execution, the likelihood of test 112A generating a false positive due to a timeout failure is reduced.

In some examples, historical data that matches up exactly with the anticipated indications of availability are not available, e.g., if the anticipated indications of availability were 10% and there are no previous time limits corresponding to previous indications of availability of 10%. In such cases, a previous time limit corresponding to previous indications of availability that is close to the anticipated indications of availability may be used. Whether previous indications of availability is "close enough" to the anticipated indications of availability may be determined by a range, which may be preset. For example, if the preset range is 5%, then the range may include previous time limits corresponding to previous indications of availability between 5% and 15%, since those values are within 5% from the anticipated indications of availability which is 10% in this example. In some examples, the previous time limit that corresponds to the closest previous indications of availability replaces the time limit 114A. For example, if the closest previous indications of availability were 7%, and the time limit corresponding to said 7% availability were 6 seconds, then time limit 114A would be adjusted to 6 seconds. In some examples, an extrapolation is performed between lower and higher time limits corresponding to lower and higher indications of availability to obtain an extrapolated time limit corresponding to the anticipated indications of availability. For example, a first previous time limit corresponding to a first previous indication of availability may be 6 seconds and 7% respectively. A second time limit corresponding to a second indication of availability may be 8 seconds and 13% respectively. The extrapolated time limit corresponding to the anticipated indications of availability may therefore be the average of the lower and the higher values, i.e., a time limit of 7 seconds corresponding to one or more anticipated indications of availability of 10%.

In some examples, historical data for the same test, i.e., test 112A are unavailable, insufficient, or not likely to be relevant. For example, historical data for test 112A may only include previous time limits corresponding to previous indications of availability (e.g., 80%) that are vastly different from the anticipated indications of availability (e.g., 10%). In some examples, if the nearest previous indications of availability are outside of the nearest neighbor search range, then adjustments to the time limit 114A may be based on data for tests similar to test 112A. For example, another test may fit the same resource usage profile as test 112A, in that both the other test and test 112A may be weighted at 80% I/O-intensive, 10% processor-intensive, and 10% memory-intensive. As with searching for a nearest neighbor with respect to previous indications of availability similar to anticipated indications of availability, the search for a nearest neighbor with respect to another test with a similar resource usage profile to test 112A may also be subject to similar search ranges. Thus, if there are no other tests that have the same resource utilization profile as test 112A, then tests which have a resource profile that is within a predetermined range, e.g., 5% of the most heavily used resource in the resource profile of test 112A may be considered. For example, if test A is most similar to test 112A, time limit 114A may be adjusted using the previous time limit of test A (e.g., 6.5 seconds) corresponding to the previous indications of availability of test A (e.g., 9%) closest to the anticipated indications of availability of test 112A (e.g., 10%). In other words, time limit 114A may be adjusted to 6.5 seconds based on test A which is similar to test 112A.

In addition to pre-emptively adjusting time limit 114A as described in various examples above, the system 100 may also responsively adjust time limit 114A upon detecting a timeout failure. For clarity, pre-failure states of some components of the system 100 may include the "A" suffix, e.g., virtual machine host 106A, the one or more indications of availability 108A, the virtual machine guest 110A, test 112A, and time limit 114A. Post-failure states of some components of the system 100 may include the "B" suffix, e.g., virtual machine host 106B, the one or more indications of availability 108B, the virtual machine guest 110B, test 112B, and time limit 114B.

A timeout failure may occur for many reasons. In some examples, a timeout failure may occur when time limit 114A is exceeded and the test 112A has not terminated. In some examples, a timeout failure may occur when test 112A fails to perform an expected action or return a response within time limit 114A. As discussed in the earlier example, test 112A may generate a timeout failure when it fails to save a document within a time limit 114A set to 5 seconds. In response, the time limit 114A may be adjusted by the host 106B, the hypervisor, or the guest 110B based on one or more indications of availability 108B.

The one or more indications of availability 108B may include one or more indications of availability after the timeout failure. In some examples, the one or more indications of availability 108B may include one or more current or anticipated indications of availability after the timeout failure. The anticipated indications of availability may refer to the indications of availability of the host 106B or the guest 110B at a time that the test 112B is anticipated to be executed with the adjusted time limit 114B. Thus, the time limit 114A may be adjusted based on current or anticipated availability data after the occurrence of a timeout failure.

The one or more indications of availability 108B may include data analogous to the one or more indications of availability 108A. For example, the one or more indications of availability 108B may also include an amount of computing resources available to the virtual machine host 106B and the virtual machine guest 110B. Further, the one or more indications of availability 108B may similarly be stored on the host 106B, the guest 110B, or both.

Post-failure adjustment to the time limit 114A may be performed in a manner similar to pre-failure adjustment to the time limit 114A and may use similar techniques, such as applying time limits corresponding to nearest neighbors of current or anticipated indications of availability, interpolation, searching for nearest neighbors within predefined ranges, and other techniques as described above. The post-failure range of adjustability of the time limit 114A may also be limited to a minimum and a maximum value, as described above. Other techniques may also be combined with the earlier described techniques. For example, the system may frequently poll for one or more indications of availability right up to the time that the test 112B is to be executed to obtain one or more current indications of availability. The closest time limit corresponding to the most recently polled indications of availability may be used to adjust time limit 114A. Thus, the adjusted time limit 114B may be an interpolated time value, a nearest time value within a predefined range, a time value from a different but similar test, etc., as described above. In some examples, the adjusted time limit 114B is extrapolated from a time limit corresponding to the nearest one or more conditions of availability. Extrapolation may be useful, for example, if there is no time limit corresponding to the one or more current indications of availability and interpolation is unavailable.

Other techniques for adjusting the time limit 114A include simply increasing the time limit 114A by a preset amount if the one or more indications of availability 108B indicates that host 106B or guest 110B is less available compared to host 106A or guest 110A. Host 106B may be the same host as or different from host 106A. Similarly, guest 110B may be the same guest as or different from guest 110A. The preset amount may vary depending on the size of the differences between one or more pre- and post-failure indications of availability. For example, if the one or more indications of availability 108B is lower than the one or more indications of availability 108A, e.g., 10% lower, then the time limit 114A may be increased by a preset amount, e.g., 1 second. For each difference between the one or more indications of availability 108B and the one or more indications of availability 108A, e.g., 20%, 30%, 40%, and so forth, the time limit 114A may be increased either by the same, constant preset amount (e.g., 1 second), or by a different preset amount, e.g., 2 seconds, 3 seconds, or 4 seconds, based on the actual or assumed mathematical relationship between the one or more indications of availability and the time limit. Thus, the preset amount may change depending on whether the mathematical relationship is actually, approximated as, determined, or assumed to be constant, linear, quadratic, power, polynomial, rational, exponential, logarithmic, sinusoidal, etc.

While the time adjustment techniques have largely been described with respect to increasing the time limit 114A, the same techniques may also be adapted for use in reducing the time limit. Generally, if availability is anticipated to increase rather than decrease, then the time limit may be reduced rather than increased. Thus, the time limit may be reduced based on a previous time limit corresponding to a previous indication of availability that matches or approximates the current or anticipated indication of availability.

In some examples, the time limit 114A may be reduced before test 112A is executed. In some examples, a scheduler, task manager, a system stack, a kernel stack, or a user mode stack may indicate that test 112A will be executed at a time when the host 106A or the guest 110A or both are likely to have high availability or have sufficient computing resources to perform the test 112A in less time than the time limit 114A. Thus, the time limit 114A may be reduced. In some examples, the time limit 114A may be reduced below an original time limit set by a test developer, i.e., a time limit before any adjustments were pre-emptively or responsively made by system 100. In some examples, the minimum value of the time limit 114A that may be set by the system 100 is the original time limit. The same techniques described above for increasing the time limit 114A before execution of test 112A may be adapted for use in decreasing the time limit 114A instead.

In some examples, time limit 114A may be reduced after test 112A is executed. Assume that test 112A was successfully executed, and that the time limit 114A had been increased to account for the decreased availability of the host 106A or the guest 110A or both. Assume that test 112A is to be executed again, when the availability of the host 106A or the guest 110A or both have increased compared to the previous execution. The adjusted time limit may be reduced based on the current or anticipated availability of the host 106A or the guest 110A or both. In more detail, if the one or more indications of availability 108A are obtained within a short timeframe prior to the execution of the test 112A, e.g., such that the obtained indications of availability 108A actually, or are assumed to, accurately reflect the availability of the host 106A or the guest 110A or both, then the one or more indications of availability 108A may be said to be "current." In some examples, one or more current indications of availability 108A may be obtained by consistent, frequent polling prior to executing a test. In some examples, to reduce the number of polls, one or more current indications of availability 108A may be obtained by single or repeated polling only within a short timeframe prior executing a test. Techniques to obtain one or more anticipated indications of availability have been described above.

Thus, system 100 may be used to pre-emptively or responsively increase or decrease the time limit of a test case.

Figure 2:
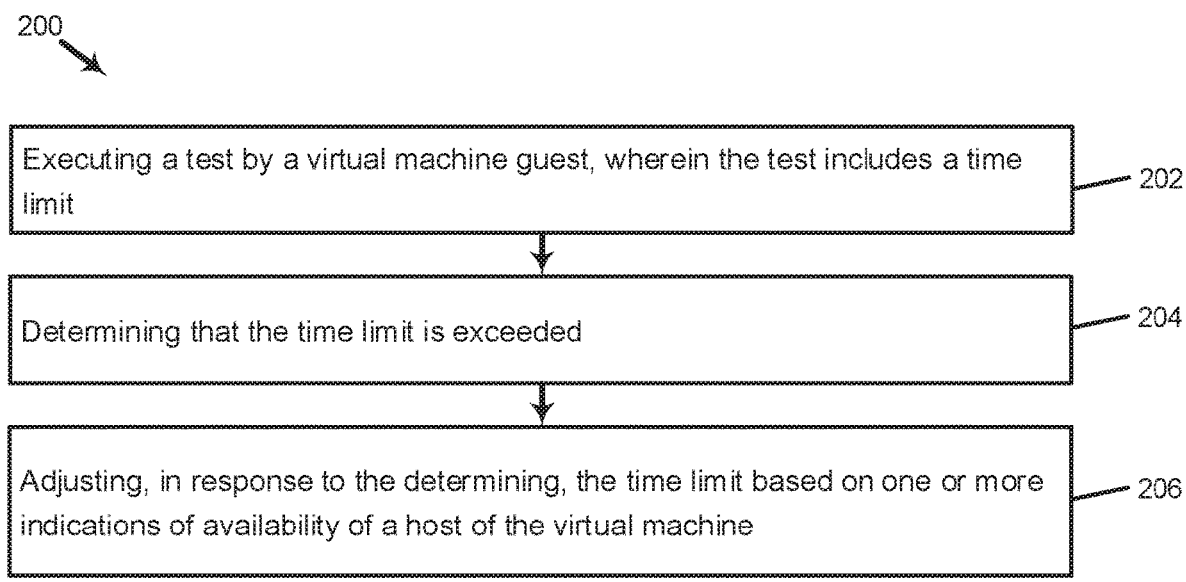
FIG. 2 is a flow diagram illustrating a method for adjusting a time limit for a test based on one or more indications of availability.

FIG. 2 is a flow diagram illustrating a method for dynamically adjusting a time limit 114A for a test 112A, in accordance with various examples of the present disclosure. The method 200 may be performed by non-transitory memory and processors. The non-transitory memory and processors may be provided, for example, by the system 100 described with respect to FIG. 1. Additional steps may be provided before, during, and after the steps of method 200, and some of the steps described may be replaced, eliminated and/or re-ordered for other examples of the method 200. Method 200 may also include additional steps and elements, such as those described with respect to FIG. 3. In some examples, method 200 may be performed by one or more computer systems 100 described with respect to FIG. 1, acting in concert or individually.

At action 202, a test is executed by a virtual machine guest. The test includes a time limit. The test may be any software test, such as a unit test, an integration test, a system test, a sanity test, a smoke test, an interface test, a regression test, an alpha test, a beta/acceptance test, a functional test, an accessibility test, an API test, a benchmark test, a code-driven test, a compatibility test, a component test, a configuration test, an error-handling test, a black box test, a white box test, a gray box test, a load test, an operational test, or any other kind of software test. The test may be part of a test case. The execution of the test or the test case may be automated by a software development platform or pipeline, including a CI/CD pipeline. The test may be part of a testing application or testing suite, which may be associated with the software development platform or pipeline. The test and the testing application or testing suite may be executable by a virtual machine guest. The time limit may include a maximum time value, a minimum time value, or both a minimum value and a maximum value.

At action 204, it is determined that the time limit is exceeded. In some examples, the time limit is exceeded when: the test is not executed within the time limit; the test is executed but does not complete within the minimum and maximum time limit; the test is executed and completed below a minimum time limit; or the test is executed and does not complete within the maximum time limit. In some examples, a test is complete when a result, negative or positive, is returned. A negative result may indicate that the tested portion of the code, e.g., a function, has failed to perform an expected result. A positive result may indicate that the tested portion of the code has succeeded in performing the expected result.

At action 206, the time limit is adjusted based on one or more indications of availability. In some examples, the time limit is adjusted in response to determining that the time limit is exceeded. In some examples, the time limit is pre-emptively adjusted before the test is executed. In some examples, the one or more indications of availability are indicative of the availability of a virtual machine host. In other examples the one or more indications of availability are indicative of the availability of a virtual machine guest. Yet, in further examples, the one or more indications of availability are indicative of both the availability of a virtual machine host and a virtual machine guest.

In some examples, the one or more indications of availability include an amount or a representation of an amount (e.g., a percentage) of computing resources available to a virtual machine host, virtual machine guest, or both. The one or more indications of availability may be stored on the virtual machine host, the virtual machine guest, or both. In some examples, the virtual machine guest may obtain the one or more indications of availability from the host. In some examples, the virtual machine guest may obtain the one or more indications of availability from the hypervisor. In some examples, the virtual machine guest directly obtains the one or more indications of availability from guest memory or guest storage. Guest memory and guest storage may be portions of the host's memory and storage assigned to the guest.

As described earlier, the computing resources include processing resources, memory resources, and I/O resources, which may be further broken down into different types of processing, memory, and I/O resources. Different tests may use different types or resources in different amounts. Thus, one test may be particularly processor-intensive, while another test may be particularly I/O-intensive. Further, a test may be particularly intensive with respect to only certain parts of the processor, memory, or I/O. For example, certain tests may tax only single processor cores, while others may tax multiple processor cores. Some tests may execute on single threads, while others may execute on multiple threads. Such detailed information about the particular resource utilization of each test may be captured and recorded as resource utilization profiles that may be specific for each test. The resource utilization profiles may be stored in a data structure, such as a database, and be used to predict the resource cost on the virtual machine host, the virtual machine guest, or both, of executing a test.

The resource utilization profiles may also be used in conjunction with one or more indications of availability to adjust the time limit. For example, if the one or more indications of availability indicates that memory availability is anticipated to be low during the time that a test will be executed, but the resource utilization profile indicates that the test is not memory-intensive but is instead I/O-intensive, then the time limit may not be adjusted if sufficient I/O resources are available. As another example, if the one or more indications of availability indicates that overall availability is at 60% but processor availability is currently at 20%, and the resource utilization profile indicates that the test has historically been performed without adjusting the time limit at 30% processor availability but has required e.g., a 1 second adjustment at 10% processor availability, then interpolation may be performed to apply a 0.5 second increase in the time limit. However, if more detailed information is known about how the test utilizes resources (e.g., processing resources) and what specific resources (e.g., processing resources) are available, a different adjustment may be made. For example, if it is known that the test had previously required e.g., a 1 second adjustment if at least a hexa-core processor is used, but the one or more indications of availability indicate that only a quad-core processor is available, then additional time may be required. In this example, since a hexa-core processor has 50% more cores than a quad-core processor and is conservatively assumed to have 50% more processing speed, the adjustment time may be correspondingly increased by 50% to e.g., 1.5 seconds. While the exemplary time adjustment techniques relate to increasing a time limit, it would also be possible to adapt the exemplary techniques for reducing a time limit.

Figure 3:
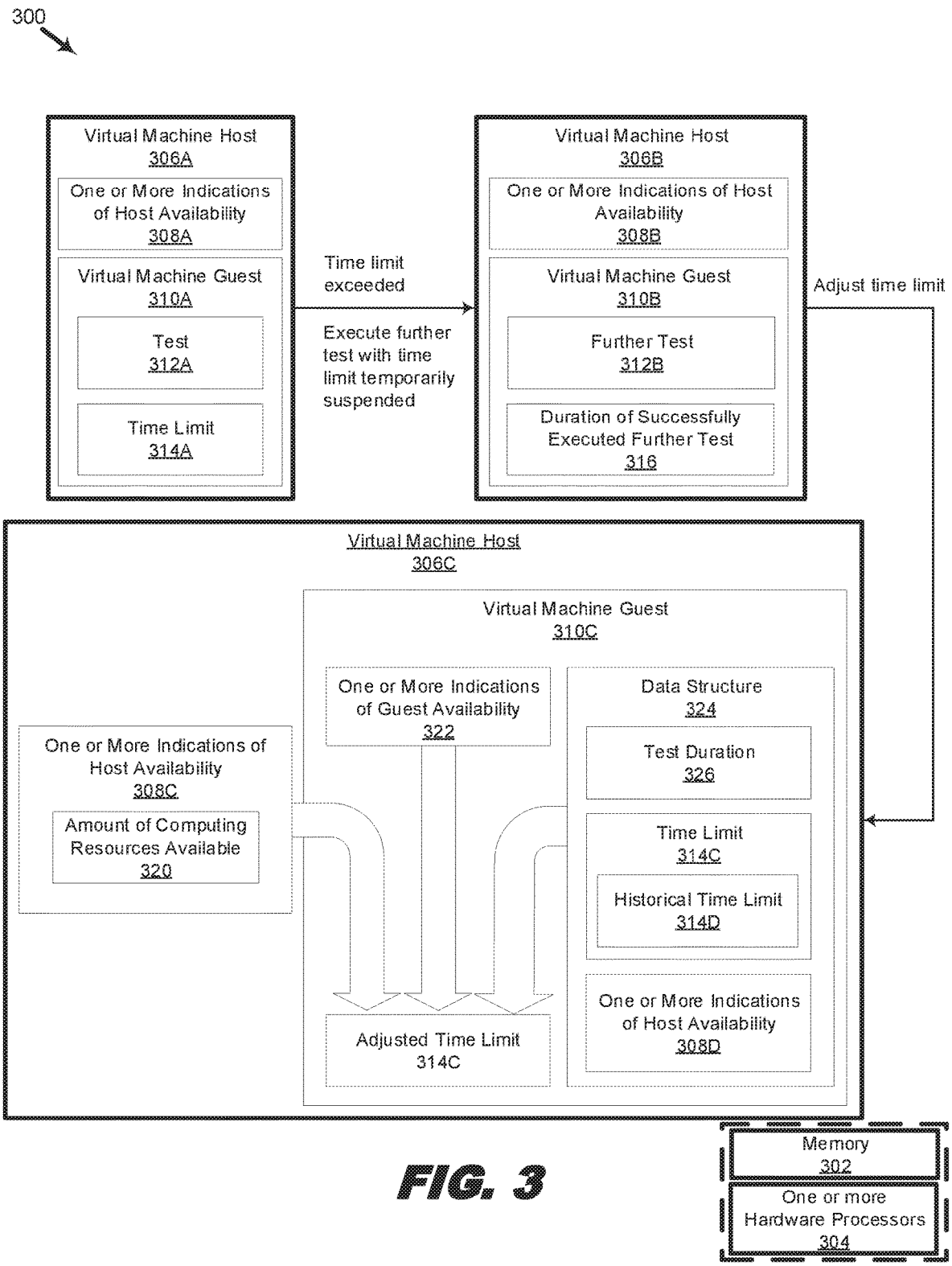
FIG. 3 is an organizational diagram illustrating a system for temporarily suspending a time limit for a test and adjusting the time limit based on one or more indications of availability.

FIG. 3 is an organizational diagram illustrating a system 300 for adjusting a time limit 314A for a test 312A after having temporarily suspended the time limit 314A, in accordance with various examples of the present disclosure. The system 300 includes a non-transitory memory 302 and one or more hardware processors 304 coupled to the non-transitory memory 302, which are similar to those described with respect to FIG. 1. In the present example, the one or more hardware processors 304 executes instructions from the non-transitory memory 302 to perform operations for: executing a test 312A with a time limit 314A on a virtual machine guest 310A running on a virtual machine host 306A having one or more indications of host availability 308A; determining that the time limit 314A is exceeded; successfully executing, by a virtual machine guest 310B running on a virtual machine host 306B having one or more indications of host availability 308B, a further test 312B; recording the duration 316 of the further successfully executed test 312B; and adjusting the time limit 314A based on any one or more of the following: one or more indications of host availability 308C; one or more indications of guest availability 322; or data from a data structure 324.

In the interest of brevity, only the salient differences between system 300 and system 100 will be described in detail. First, FIG. 3 illustrates system 300 in three states. The first state, shown in the top left and including elements with suffix "A," represents an initial state prior to executing a test 312A with time limit 314A. The second state, shown in the top right and including elements with suffix "B," represents an intermediate state after the time limit 314A is exceeded. While in the second state, the time limit 314A is suspended and a further test 312B is performed. The third state, shown in the bottom middle and including elements with suffix "C," represents a state where the further test 312B is successful. While in the third state, the time limit 314A is reinstated and adjusted.

Further test 312B may be identical to test 312A. Thus, in some examples, performing further test 312B is essentially repeating the performance of test 312A. The difference is that further test 312B is performed without the constraint of time limit 314A. In other words, time limit 314A may be said to be "suspended" when further test 312B is performed. Such suspension may be temporary. In some examples, time limit 314A may be suspended by temporarily removing the time limit 314A. For example, code corresponding to time limit 314A may be temporarily deleted or commented out. In other examples, time limit 314A may be suspended by temporarily increasing the time limit 314A to high enough value that it is unlikely for the time limit 314A to be breached. For example, the time limit 314A may be increased by a factor between 0 and 1; 1 and 10; 1 and 100; 1 and 1000; 1 and 10000; etc. The factor may be chosen such that the highest previous time limit corresponding to the current or anticipated availability of the virtual machine host 306B, virtual machine guest 310B, or both, is well exceeded. The time limit 314A may also be set to infinity or pseudo-infinity.

Temporary suspension of time limit 314A may be used to determine if the timeout failure in test 312A was a false positive. If further test 312B completes and returns a correct result, then it may be determined that the timeout failure was a false positive, and the only correction that needs to be made is with respect to the time limit 314A. However, if further test 312B completes but returns a wrong result, then it may be determined that the timeout failure was also a false positive, because the actual issue is that that the test 312A was incorrectly programmed. Nevertheless, the time limit 314A should be increased. However, if further test 312B still does not complete despite suspending time limit 314A, then it may be determined that the timeout failure was not a false positive. Here, since test 312A was incorrectly programmed, it would be useless to adjust time limit 314A.

If further test 312B is successfully executed, then the duration 316 of the successfully executed further test 312B may be recorded in data structure 324. For example duration 316 of the successfully executed further test 312B may be included in test duration 326 of data structure 324. Test duration 326 may include all types of durations for all types of tests, not only duration 316 of successfully executed further tests 312B. For example, test duration 326 may include durations of failed tests 312A, durations of successful first tests, and durations of different parts of tests e.g., duration of a part of a test testing a first function, a second function, etc. The data structure 324 may be stored on the virtual machine guest 310C, on the virtual machine host 306C, or both. Virtual machine guest 310C may be the same or different guest as guest 310A and/or guest 310B, with the suffixes "A," "B," and "C" denoting different points in time. Virtual machine host 306C may be the same or different host as host 306A and/or host 306B, with the suffixes "A," "B," and "C" denoting different points in time.

The test duration 326 includes the amount of time taken for a test to complete, and may be shorter or longer than the corresponding time limit set for that test, e.g., time limit 314C. The time limit for each completed and incomplete test may be recorded in time limit 314C. Each entry in time limit 314C may have a corresponding test duration 326. The time limit 314C may include a current time limit that applies to a current execution of a test, and a historical time limit 314D that applied to previous executions of the test. The data structure 324 may also include one or more indications of host availability 308D. The one or more indications of host availability 308D stored in data structure 324 may include the same data as the one or more indications of host availability 308C stored in host 306C, such as an amount 320 of computing resources available. The amount 320 of computing resources available may be an amount of historic, current or anticipated amount of computing resources available to the host 306C. The guest 310C may store one or more indications of guest availability 322 outside of data structure 324. For example, one or more current indications of guest availability 322 may be queried using a "top," "mpstat," "sar," "iostat" command in LINUX. In some examples, such queried current indications are stored in a region of memory 302 other than data structure 324. In some examples, such queried current indications are written into data structure 324.

Thus, data structure 324 may include one or more entries, each entry including a test identifier, a test duration 326, a time limit 314C, a historical time limit 314D, and one or more indications of host availability 308D. Data structure 324 may include primitive data types, composite data types, abstract data types, arrays, lists, binary trees, B-trees, heaps, trees, multiway trees, space-partitioning trees, application-specific trees, hash-based structures, graphs, or any other data structure type.

Additionally, if further test 312B is successfully executed, time limit 314A may be reinstated and adjusted. Reinstatement and adjustment may be performed at the same time. For example, removing the comments around code corresponding to time limit 314A and increasing or decreasing the time limit 314A, or rewriting code corresponding to time limit 314A but with a changed time limit value. As earlier explained, adjusted time limit 314C may be based on one or more indications of host availability 308C obtained from host 306C and one or more indications of guest availability 322. Additionally, adjusted time limit 314C may be based on data contained in data structure 324, such as test duration 326, time limit 314C, and one or more indications of host availability 308D obtained from guest 310C. In some examples, the one or more indications of host availability 308C includes one of more current indications of availability of the host 306C. In some examples, the one or more indications of host availability 308D includes historical indications of availability of the host 306C. Together, the one or more indications of host availability 308C and 308D may paint a current and historical picture of availability of the host 306C. The data structure 324 may include an index, such as a test identifier, with which all test data is associated to create a test profile. For example, test duration 326, time limit 314C, historical time limit 314D, one or more indications of host availability 308D, and one or more indications of guest availability 322 may be associated with the index. The data structure 324 may also store the resource usage profiles earlier described.

Techniques for using time limits, such as time limit 314C and historical time limit 314D, and one or more indications of host or guest availability, 308C and 322, have been described earlier. Additionally, the adjusted time limit 314C may be based on test duration 326. For example, assume that in the following scenario, the time limit 314A was originally set to 5 seconds by a test developer. The test 312A is executed but fails to complete within the 5-second time limit 314A. In response, the 5-second time limit 314A is temporarily suspended by setting the time limit 314A to 500 seconds. Further test 312B is successfully executed, and the duration 316 of successfully executed further test 312B is 11 seconds. Since the further test 312B completed within the duration 316, the adjusted time limit 314C may be set equal to the duration 316, i.e., 11 seconds, assuming equal availability of the host and/or guest the next time the same test is executed. If availability is currently or anticipated to be different at the next execution, then the adjusted time limit 314C may also be based on one or more indications of host availability, 308C, one or more indications of guest availability, 322, or both.

Duration 316 may also be useful in determining whether to reduce a time limit. For example, if duration 316 is lower than a time limit by some predetermined margin, then the time limit may be reduced. The size of the predetermined margin may be based on: a fixed amount of time, e.g., 1 second; a percentage of the duration or time limit, e.g., 20%; a number of standard deviations away from an average duration 316, e.g., 3 standard deviations; or any other technique for sizing a safety factor or buffer.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A computer-implemented method comprising:
   executing a test by a virtual machine guest, wherein the test includes a time limit that includes a maximum time in which the test is to be completed without causing a timeout;
   determining that the time limit is exceeded if a duration of the test exceeds the maximum time;
   determining a number of tasks scheduled to run on a host of the virtual machine;
   comparing the number of tasks scheduled to run on the host of the virtual machine to a threshold number of tasks;

determining that the number of tasks scheduled to run on the host of the virtual machine exceeds the threshold number of tasks; and adjusting, in response to the determining that the time limit is exceeded and that the number of tasks exceeds the threshold, the maximum time based on one or more indications of availability of a system, wherein the indications of availability include the tasks scheduled to run on the host of the virtual machine, wherein the one or more indications of availability includes an anticipated indication of availability, wherein the adjusting includes replacing the time limit with a time limit corresponding to one or more previous indications of availability when the one or more previous indications of availability matches with one or more anticipated indications of availability, and wherein the determining that the time limit will be exceeded prior to executing the test includes inspecting a stack and anticipating one or more indications of availability at a time of a scheduled execution of the test.

2. The method of claim 1, wherein the adjusting includes increasing the time limit.

3. The method of claim 1, wherein the one or more indications include an amount of computing resources available.

4. The method of claim 1, further comprising storing, in a data structure, a test duration of the executed test, the time limit, and the one or more indications of availability.

5. The method of claim 1, wherein the adjusting is further based on one or more historical time limits.

6. The method of claim 1, further comprising adjusting the time limit based on one or more indications of availability of the virtual machine guest.

7. The method of claim 1, further comprising temporarily suspending the time limit prior to the adjusting.

8. The method of claim 7, wherein temporarily suspending the time limit includes deleting code corresponding to the time limit.

9. The method of claim 7, wherein temporarily suspending the time limit includes temporarily commenting out code corresponding to the time limit.

10. The method of claim 7, wherein temporarily suspending the time limit includes temporarily increasing the time limit.

11. The method of claim 7, further comprising executing a further test while the time limit is temporarily suspended.

12. The method of claim 11, further comprising determining that the further test is successfully executed.

13. The method of claim 12, further comprising determining a duration of the further successfully executed test.

14. The method of claim 13, further comprising reinstating the time limit.

15. The method of claim 14, wherein the adjusting the time limit is also based on the duration of the further successfully executed test.

16. A system comprising:
a non-transitory memory; and
one or more hardware processors coupled to the non-transitory memory to execute instructions from the non-transitory memory to perform operations comprising:

executing a test, wherein the test includes a time limit that includes a maximum time, wherein the test is aborted if the maximum time is met;

determining that the time limit is exceeded if a duration of the test exceeds a maximum time; and adjusting, in response to the determining, the maximum time based on one or more indications of availability of the system, wherein the indications of availability include tasks scheduled to run on a host of a virtual machine, wherein the one or more indications of availability includes an anticipated indication of availability, wherein the adjusting includes replacing the time limit with a time limit corresponding to one or more previous indications of availability when the one or more previous indications of availability matches with one or more anticipated indications of availability, and wherein the determining that the time limit will be exceeded prior to executing the test includes inspecting a stack and anticipating one or more indications of availability at a time of a scheduled execution of the test.

17. A non-transitory machine-readable medium having stored thereon machine-readable instructions executable to cause at least one machine to perform operations comprising:

scheduling a test for execution, wherein the test includes a time limit that includes a maximum time, wherein the test is aborted if the maximum time is met;

determining that the time limit will be exceeded prior to executing the test; and adjusting, in response to the determining, the maximum time based on one or more indications of availability of the machine, wherein the indications of availability include tasks scheduled to run on a host of a virtual machine, wherein the one or more indications of availability includes an anticipated indication of availability, wherein the adjusting includes replacing the time limit with a time limit corresponding to one or more previous indications of availability when the one or more previous indications of availability matches with one or more anticipated indications of availability, and wherein the determining that that the time limit will be exceeded prior to executing the test includes inspecting a stack and anticipating one or more indications of availability at a time of the scheduled execution of the test.

* * * * *